(12) United States Patent
Green, Jr.

(10) Patent No.: US 7,393,301 B2
(45) Date of Patent: Jul. 1, 2008

(54) GEAR DRIVEN DIRECT DIFFERENTIAL CROSS

(75) Inventor: Michael Green, Jr., Kalamazoo, MI (US)

(73) Assignee: Dana Heavy Vehicle Systems Group, LLC, Toledo, OH (US)

( * ) Notice: Subject to any disclaimer, the term of this patent is extended or adjusted under 35 U.S.C. 154(b) by 209 days.

(21) Appl. No.: 11/198,091

(22) Filed: Aug. 5, 2005

(65) Prior Publication Data
US 2007/0032334 A1      Feb. 8, 2007

(51) Int. Cl.
*F16H 57/08*     (2006.01)
*F16H 37/06*     (2006.01)

(52) U.S. Cl. ........................................ 475/332; 475/331

(58) Field of Classification Search ............ 475/230, 475/331, 332
See application file for complete search history.

(56) References Cited

U.S. PATENT DOCUMENTS

| | | | | |
|---|---|---|---|---|
| 1,987,716 A | * | 1/1935 | Skelton | ........................ 475/246 |
| 2,392,441 A | * | 1/1946 | Wildhaber | ................... 475/233 |
| 2,769,353 A | * | 11/1956 | Nash | ........................... 475/234 |
| 3,362,258 A | * | 1/1968 | Thornton | .................... 475/231 |
| 4,125,026 A | | 11/1978 | Torii et al. | |
| 4,683,775 A | * | 8/1987 | Hilker et al. | ................. 475/150 |
| 6,527,663 B2 | * | 3/2003 | Ballinger et al. | ............ 475/230 |
| 6,540,634 B2 | * | 4/2003 | Thompson | .................... 475/86 |
| 6,623,396 B2 | | 9/2003 | Szalony et al. | |
| 6,652,408 B2 | * | 11/2003 | Rutt et al. | .................... 475/230 |
| 6,743,138 B2 | * | 6/2004 | Krzesicki et al. | ............ 475/230 |
| 2003/0144106 A1 | | 7/2003 | Szalony et al. | |

FOREIGN PATENT DOCUMENTS

EP         1 203 901 A2    5/2002

OTHER PUBLICATIONS

International Search Report issued in corresponding application PCT/2006/027059 (Jan. 4, 2006).
Written Opinion issued in corresponding application PCT/2006/027059 (Jan. 4, 2006).

* cited by examiner

*Primary Examiner*—Tisha D Lewis
(74) *Attorney, Agent, or Firm*—Dykema Gossett PLLC

(57) ABSTRACT

A drive axle assembly is provided in which the differential cross-shaft supporting the differential gears is driven directly by the ring gear. The assembly reduces loading on the differential case to which the ring gear is attached thereby enabling the use of low capacity joints between the ring gear and differential case and/or a lighter differential case.

5 Claims, 1 Drawing Sheet

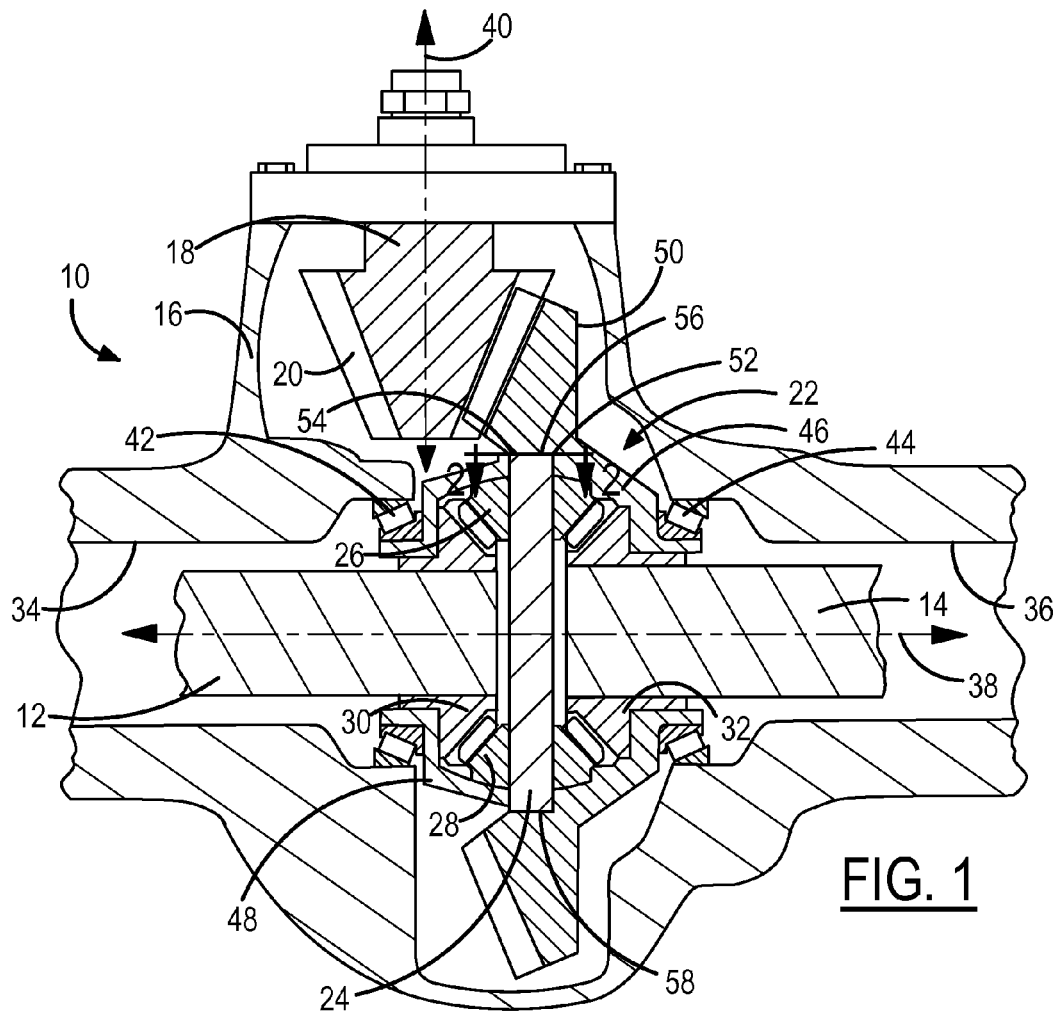
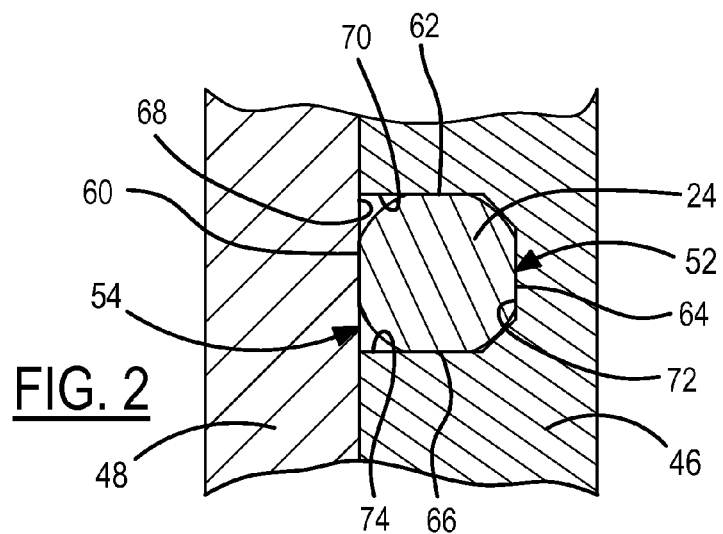

GEAR DRIVEN DIRECT DIFFERENTIAL CROSS

BACKGROUND OF THE INVENTION

1. Field of the Invention

This invention relates to drive axle assemblies and, in particular, to a drive axle assembly in which a differential cross-shaft is driven directly by a ring gear.

2. Discussion of Related Art

A conventional drive axle assembly includes a drive axle housing from which a pair of axle shafts extend to rotatably support one or more ground engaging wheels on opposites sides of a vehicle. Power is input to the drive axle assembly through an input shaft that rotates a pinion gear. The pinion gear engages a ring gear that is coupled to a differential case rotatably supported within the drive axle housing. Within the differential case, a plurality of differential gears are mounted on a differential cross-shaft or spider. Rotation of the differential case (through the action of the pinion gear and ring gear) causes rotation of the cross-shaft and differential gears. The differential gears engage side gears that are coupled to the axle shafts.

In most conventional drive axle assemblies, the ring gear is coupled to the differential case using fasteners such as bolts or welds. Torque is transferred from the ring gear through the fasteners to the differential case and differential cross-shaft. Over time, fasteners such as bolts may loosen and welds may break under the constant loads transmitted between the ring gear and differential case.

The inventors herein have recognized a need for a drive axle assembly that will minimize and/or eliminate one or more of the above-identified deficiencies.

SUMMARY OF THE INVENTION

The present invention provides a drive axle assembly that reduces loads on the differential case.

A drive axle assembly in accordance with the present invention includes a drive axle housing, an input shaft disposed within the housing about an axis of rotation, and a pinion gear driven by the input shaft. The assembly further includes a differential case supported for rotation within the drive axle housing. The differential case includes first and second members configured to receive first and second side gears and first and second axle half shafts, respectively. The first member of the differential case includes a ring gear in engagement with the pinion gear and defines a first shoulder. The first and second members of the differential case define a second shoulder opposing the first shoulder at an intersection of the first and second portions of the differential case. The assembly further includes a plurality of differential gears supported for rotation within the differential case and in engagement with the first and second side gears. Finally, the assembly includes a differential cross-shaft supporting the plurality of differential gears. The differential cross-shaft is supported between the first and second shoulders of the differential case.

A drive axle assembly in accordance with the present invention is a significant improvement over conventional drive axle assemblies. The arrangement of the differential case enables the differential cross-shaft to be directly driven by the ring gear. As a result, torsional loads in the differential case are minimized. Because the differential case does not carry the torsional loads, the differential case can be made lighter reducing material costs and improving fuel economy. Further, lower capacity joints, and fewer of them, can be used between the ring gear and differential case without fear that the joints will break.

These and other advantages of this invention will become apparent to one skilled in the art from the following detailed description and the accompanying drawings illustrating features of this invention by way of example.

BRIEF DESCRIPTION OF THE DRAWINGS

FIG. 1 is a top cross-sectional view of a drive axle assembly in accordance with the present invention.

FIG. 2 is a rear cross-sectional view of a drive axle assembly in accordance with the present invention taken along lines 2-2 in FIG. 1.

DETAILED DESCRIPTION OF EMBODIMENTS OF THE INVENTION

Referring now to the drawings wherein like reference numerals are used to identify identical components in the various views, FIG. 1 illustrates a drive axle assembly 10 in accordance with the present invention. Assembly 10 is particularly adapted for use in medium and heavy trucks. It should be understood, however, that the present invention is not limited to use in medium or heavy trucks and may be used in a wide variety of vehicles and non-vehicular applications. Assembly 10 may comprise the rear drive axle assembly of a tandem drive axle assembly. Assembly 10 is provided to drive wheels (not shown) supported on either side of assembly 10 on axle half shafts 12, 14 extending from axle assembly 10. Assembly 10 may include a drive axle housing 16, an input shaft 18, a pinion gear 20, a differential case 22, a differential cross-shaft 24, a plurality of differential gears 26, 28 and a pair of side gears 30, 32 coupled to half shafts 12, 14.

Drive axle housing 16 houses, provides supports for, and maintains the relative position of the other components of assembly 10. Housing 16 may be made from conventional metals and metal alloys such as steel and is conventional in the art. Housing 16 may be made from several members coupled together using conventional fasteners (not shown). Housing 16, defines a pair of openings 34, 36 disposed about an axis 38 of rotation for axle half shafts 12, 14 and through which shafts 12, 14 extend.

Input shaft 18 transfers torque from a drive shaft (not shown) to pinion gear 20 and is conventional in the art. Shaft 18 is disposed within housing 16 about an axis 40 of rotation that extends generally perpendicular to axis 38. Shaft 18 is supported for rotation within housing 16 by a pair of bearing assemblies (not shown) and may be coupled to the drive shaft using a conventional universal joint coupling.

Pinion gear 20 transfers torque from shaft 18 to differential case 22 and is conventional in the art. Pinion gear 20 may be made from conventional metals and metal alloys and may comprise a hypoid gear. Gear 20 rotates about axis 40. Gear 20 is disposed about shaft 18 and may be integral with shaft 18 or mounted to shaft 18 using a conventional spline connection or in other ways customary in the art.

Differential case 22 is provided to house cross-shaft 24, differential gears 26, 28, side gears 30, 32 and half shafts 12, 14. Case 22 may be made from conventional metals and metal alloys. Case 22 is supported for rotation within housing 16 by bearings 42, 44 which may comprise tapered roller bearings. Case 22 includes two members 46, 48 that may be coupled together using conventional fasteners such as bolts or welds.

Member 46 of case 22 includes a ring gear 50 in meshed engagement with pinion gear 18. In the illustrated embodiment, member 46 is unitary in construction and ring gear 50 is integral with the remainder of member 46. Alternatively ring gear 50 may comprise a separate component fastened to the remainder of member 46. Because the inventive assembly transfers torque directly from ring gear 50 to cross-shaft 24, conventional fasteners such as bolts or welds that couple ring gear 50 to the remainder of member 46 are less likely to break and lower-capacity joints of these types and/or fewer joints can be readily used. Member 46 also defines a shoulder 52 sized and shaped complementary to cross-shaft 24 as described in greater detail hereinbelow.

Member 48 of case 22, together with member 46 of case 22, defines a second shoulder 54 at the intersection of members 46, 48 sized and shaped complementary to cross-shaft 24. Shoulder 54 is formed opposite shoulder 52 and, in particular, on a diametrically opposite side of cross-shaft 24.

Cross-shaft or spider 24 provides a mounting arrangement for differential gears 26, 28 and is conventional in the art. Cross-shaft 24 may include a plurality of radially outwardly extending arms on which differential gears 26, 28 are mounted. In the illustrated cross-section only two differential gears 26, 28 are shown. It should be understood, however, that cross-shaft 24 may have additional arms for mounting additional gears. Shaft 24 rotates about axis 38 with case 22. Shaft 24 may have a uniform diameter from one longitudinal end 56 of shaft 24 to an opposite longitudinal end 58 of shaft 24.

In accordance with the present invention, shaft 24 is supported between shoulders 52, 54 and is driven directly by ring gear 50. As shown in FIG. 1, either longitudinal end 56, 58 of cross-shaft 24 engages ring gear 50 in a loose fit or press fit relationship. Referring to FIG. 2, the radially outer surface of cross-shaft 24 may define a plurality of flats 60, 62, 64, 66 proximate each longitudinal end 56, 58 of cross-shaft 24. Flats 60, 62, 64, 66 engage corresponding flats 68, 70, 72, 74 in members 46, 48 of case 22-including flats 60, 64 formed by shoulders 52, 54. Flats 60, 62, 64, 66 may be evenly spaced circumferentially about cross-shaft 24. In the illustrated embodiment, cross-shaft 24 includes four flats 60, 62, 64, 66 with a first pair of diametrically opposed flats 60, 64 engaging flats 68, 72 formed in members 46, 48 (at shoulders 52, 54) and a second pair of diametrically opposed flats 62, 66 engaging flats 70, 74 formed in member 46. It should be understood, however, that the number of flats and indeed the complementary shapes of cross-shaft 24 and members 46, 48 proximate ends 56, 58 of cross-shaft 24 may vary without departing from the spirit of the present invention.

Differential gears 26, 28 and side gears 30, 32 are provided to divide and transfer torque between axle half shafts 12, 14. Gears 26, 28, 30 and 32 are conventional in the art and may be made from conventional metals and metal alloys. Gears 26, 28 are supported for rotation within case 22 and in meshing engagement with said side gears 30, 32. Gears 26, 28 are mounted on cross-shaft 24 for rotation with cross-shaft 24. Gears 30, 32 are mounted on axle half shafts 12, 14 through mating splines or in other customary ways for rotation with shafts 12, 14. Gears 30, 32 (and half shafts 12, 14) rotate in response to rotation of gears 26, 28.

A drive axle assembly in accordance with the present invention represents an improvement as compared to conventional drive axle assemblies. The engagement between members 46, 48 of case 22, ring gear 50 and cross-shaft 24 enables cross-shaft 24 to be driven directly by ring gear 50. As a result, torsional loads in differential case 22 are minimized. Because case 22 does not carry the torsional loads, case 22 can be made lighter thereby reducing material costs and improving fuel economy. Further, lower capacity joints, and fewer of them, can be used between the ring gear 50 case 22 to couple ring gear 50 without fear that the joints will break.

While the invention has been shown and described with reference to one or more particular embodiments thereof, it will be understood by those of skill in the art that various changes and modifications can be made without departing from the spirit and scope of the invention.

I claim:

1. A drive axle assembly, comprising:
   a drive axle housing;
   an input shaft disposed within said housing about an axis of rotation;
   a pinion gear driven by said input shaft;
   a differential case supported for rotation within said drive axle housing, said differential case including first and second members configured to receive first and second side gears and first and second axle half shafts, respectively, said first member of said differential case including a ring gear in engagement with said pinion gear and defining a first shoulder, said first and second members of said differential case defining a second shoulder opposing said first shoulder at an intersection of said first and second members of said differential case;
   a plurality of differential gears supported for rotation within said differential case and in engagement with said first and second side gears; and,
   a differential cross-shaft supporting said plurality of differential gears, said differential cross-shaft supported between said first and second shoulders
   wherein said first shoulder is formed by first and second surfaces of said first member extending generally perpendicular to one another and forming a first corner and said second shoulder is formed by said second surface of said first member and a first surface of said second member extending generally perpendicular to one another and forming a second corner, said differential cross-shaft engaging said first and second corners.

2. The drive axle assembly of claim 1, wherein a diameter of said cross-shaft is uniform from one longitudinal end to an opposite longitudinal end.

3. The drive axle assembly of claim 1 wherein said first member of said differential case is unitary in construction.

4. The drive axle assembly of claim 3 wherein said first member is supported for rotation within said drive axle housing by a set of bearings.

5. A drive axle assembly, comprising:
   a drive axle housing;
   an input shaft disposed within said housing about an axis of rotation;
   a pinion gear driven by said input shaft;
   a differential case supported for rotation within said drive axle housing, said differential case including first and second members configured to receive first and second side gears and first and second axle half shafts, respectively, said first member of said differential case including a ring gear in engagement with said pinion gear and defining a first shoulder, said first and second members of said differential case defining a second shoulder opposing said first shoulder at an intersection of said first and second members of said differential case;
   a plurality of differential gears supported for rotation within said differential case and in engagement with said first and second side gears; and,
   a differential cross-shaft supporting said plurality of differential gears, said differential cross-shaft supported between said first and second shoulders
   wherein said differential cross-shaft has first, second, third and fourth circumferentially spaced flats, said first member of said differential case engaging said first, second and third flats and said second member of said differential case engaging said fourth flat.

* * * * *